United States Patent
Sewell

[11] Patent Number: 6,076,843
[45] Date of Patent: Jun. 20, 2000

[54] GUARDING MECHANISM FOR A WHEEL AND AXLE ASSEMBLY

[75] Inventor: John P. Sewell, Aurora, Ill.

[73] Assignee: Caterpillar Inc., Peoria, Ill.

[21] Appl. No.: 09/022,465

[22] Filed: Feb. 12, 1998

[51] Int. Cl.[7] ................................................. B62D 25/16
[52] U.S. Cl. ........................................... 280/157; 280/848
[58] Field of Search ................................. 280/847, 848, 280/157, 855, 159, 160, 770; 293/112

[56] References Cited

U.S. PATENT DOCUMENTS

| | | | |
|---|---|---|---|
| 3,879,059 | 4/1975 | Gibes | 280/848 |
| 4,966,376 | 10/1990 | Cook | 280/848 |
| 5,074,583 | 12/1991 | Dick | 280/848 |
| 5,511,808 | 4/1996 | Rowland | 280/848 |
| 5,915,708 | 6/1999 | Blackbarn | 280/157 |

*Primary Examiner*—Richard M. Camby
*Attorney, Agent, or Firm*—William C. Perry

[57] ABSTRACT

In the operation of machines of the type that are typically designed to traverse terrain having deposits of debris, it is a common problem to have the debris become attached to the wheels of the machine and rotate therewith. In many instances this causes material to become entrained around the axles of the machine requiring continual maintenance and occasionally causing damage to the axle components. The present invention provides a guard member that is positioned about the axle assemblies to reduced the chance of material falling from the wheels onto the axle assemblies. The guard member defines a plurality of angled plates that are positioned in closely adjacent, parallel proximity to a plurality of wear strips that are positioned equidistantly about the wheel. The angled plates are positioned at angles that are offset from the each other and the wear strips and react in a scissoring manner with respect to one another to shear any material that may become lodged therebetween.

15 Claims, 5 Drawing Sheets

Fig_3

GUARDING MECHANISM FOR A WHEEL AND AXLE ASSEMBLY

TECHNICAL FIELD

This invention relates to a guarding assembly and more particularly to a guarding mechanism to prevent the build-up of material around a wheel and axle assembly.

BACKGROUND ART

In the operation of construction machinery, especially the type known as a landfill compactor, it is quite common for the machine to traverse terrain that is filled with debris. In the case of a landfill compactor, the machine is driven over trash of all kinds to compact or compress it so that maximum use may be made of the available space on the landfill site.

In many landfill sites, there is an abundance of cable, wire, strands of scrap from manufacturing operations and strands of many other types of material. When operating over this type of material, it is quite common for the teeth of the drum-type wheels to become attached to these strands of material as they roll over it. In doing so, the strands of material are caused to revolve with the wheel and many times fall from the upper portion of the wheel, down on the axle. As the movement of the machine continues, the strands can become wrapped around the axle. In some instances, the material will become tightly wrapped around the axle and the wound material will tend to work its way along the axle in the direction of the wheel. This is an area wherein the final drive of the wheel assembly interfaces with the axle. Since the wheel assembly rotates along this interface and the axle does not, a rotational seal is required at this interface to keep dirt out and lubricating fluid within the axle assembly. It is a common and vexatious problem when this material becomes wound around the axle in the area of the seal interface because the strands, by the force of the winding, are forced into the sealed interface. When this happens the integrity of the seal is destroyed creating the need for immediate repair. This not only takes the machine out of production, it is also known to have a deleterious effect on the components of the drive assembly.

The present invention is directed to overcoming one or more of the problems set forth above.

DISCLOSURE OF THE INVENTION

In one aspect of the present invention, a guarding mechanism for a wheel and axle assembly is provided. The guarding mechanism includes a frame to which the axle assembly is mounted. The axle assembly is positioned to extend laterally from the frame. A wheel member is provided that has a hub portion, a drum portion that is positioned concentrically about the hub member. A pair of side walls are positioned radially between the hub portion and the drum portion to form an inner and an outer side wall. The wheel member is mounted on the axle member for rotation about an axis that is defined by the axle. At least one wear strip is mounted on the inner side wall of the wheel member and is positioned thereon to extend radially from the axis. The wear strip is rotatable about the axis with the wheel member along a path of rotation that is spaced from the frame a preselected distance. A guard member, having at least one laterally extending plate member, is mounted to either the axle assembly or the frame in a manner to position the plate member in closely adjacent proximity to the path of rotation defined by the wear strip mounted on the wheel member.

In another aspect of the present invention, a guard mechanism is provided that is adapted for use between an axle assembly mounted to a frame and a wheel member that is mounted to an axle assembly. The wheel member rotates with respect to the axle assembly about an axis that is defined by the axle assembly. A plurality of wear strips are mounted to an inner side wall of the wheel member. The wear strips are positioned to extend in a generally radial direction with respect to the axis along a centerline that extends from the axis. The wear strips rotate about the axis along a preselected path of rotation. A guard member, having a plurality of plates defined thereon, is mounted to the frame with the plates generally radially oriented with respect to the axis along centerlines that are radially offset from the axis. The plates extend axially from the frame to a location that is in closely adjacent proximity to the preselected path of rotation defined by the wear strips.

With a guard mechanism as set forth above, a plurality of wear strips are provided on an inner side wall of the wheel to rotate with the wheel. The wear strips rotate in very close proximity to a plurality of plates that are defined by the guard member that is mounted about the axle. Since the wear strips are oriented along a centerline that is centered on the axis of the axle, and the plates are positioned along centerlines that are offset from the axle, the wear strips and the plates will be positioned at an angle to one another when the wear strips are moved passed the plates. Since the plates are positioned to extend laterally from the frame to a location that is in close proximity to the wear strips, the interaction between the wear strips and plates is similar to that of scissors or shears. Any material that should happen to fall from the wheel onto the guard member is susceptible to being sheared in two before it has a chance to wrap around the axle.

BEST MODE FOR CARRYING OUT THE INVENTION

Figure 3:
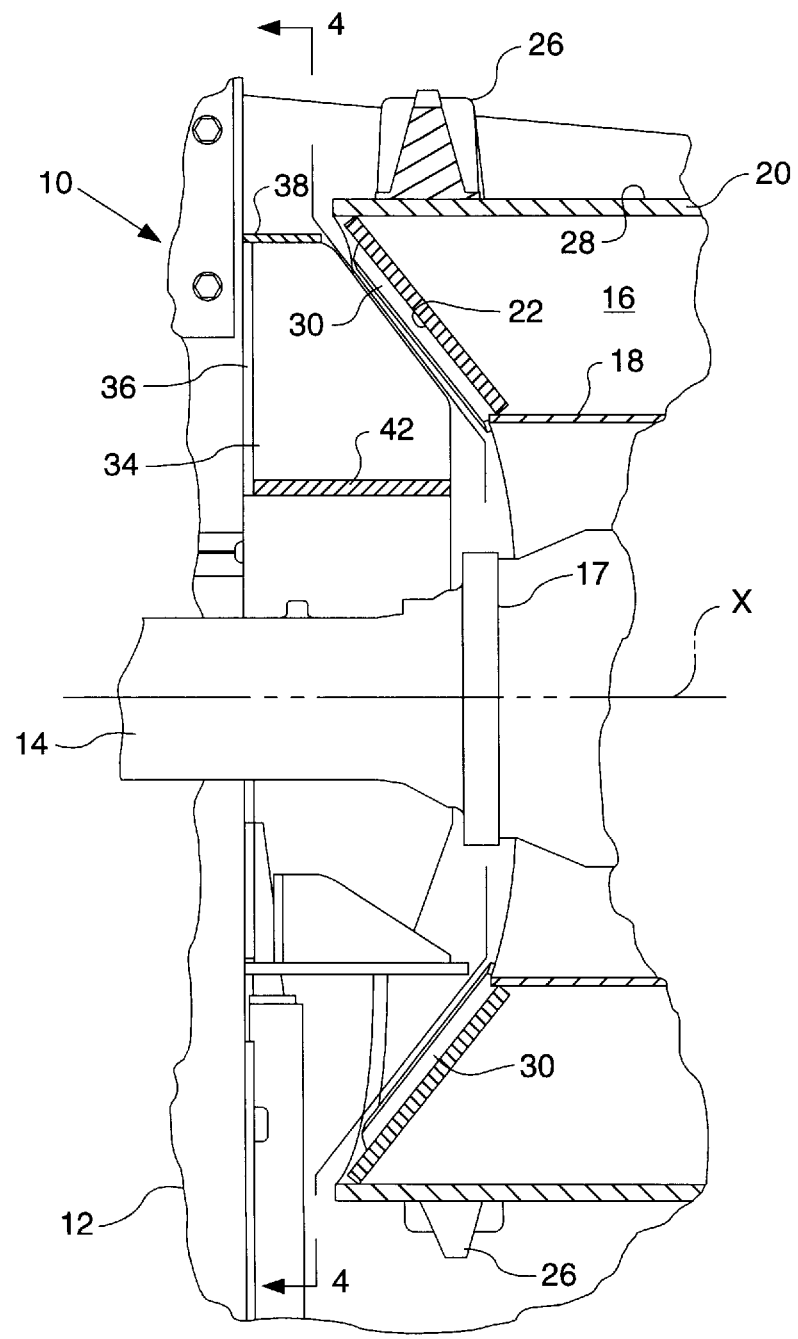
FIG. 3 is a diagrammatic section view taken along lines 3—3 of FIG. 1.

Referring to the drawings it can be seen that a guard mechanism 10 for a machine, such as a landfill compactor, is shown. The machine has a main frame portion 12 that supports an axle assembly 14 (FIG. 3). The axle assembly is positioned in transverse relation to the centerline of the machine and extends laterally from opposite sides of the frame. A wheel member 16 is mounted to each axle assembly 14 for rotation with respect thereto about an axis X. Since there is relative rotation between the wheel 16 and the axle assembly, a seal interface 17 (FIG. 3) of well known construction is required along the line of relative rotation. While only one wheel member is shown, it is to be understood that the machine will normally have at least two axle assemblies, with a wheel member mounted to the end portion of each. Also, in the illustrated embodiment, the axle assembly 14 is shown and described as being fixedly mounted to the frame 12, however the axle assembly may be pivotally mounted to the frame to "oscillate" with respect thereto and not depart from the intent of the present invention.

The wheel 16 defines a centrally disposed hub portion 18 and a cylindrical drum portion 20 that is positioned concentrically with respect to the hub portion 18 and the axis X. The drum portion is connected to the hub portion by inner and outer side walls (one shown). In the illustrated embodiment, the drum portion is substantially wider than the hub portion and the side walls are tapered inwardly from the drum portion to the hub portion. It is to be understood, however, that the side walls could be substantially flat and not depart from the spirit of the present invention. The inner side wall 22, shown in FIG. 3, defines a substantially conical shape with respect to the frame 12. In the illustrated embodiment, a plurality of teeth 26 are positioned on an outer surface 28 of the drum. The teeth are spaced apart in a specific pattern across the outer surface of the drum member in a well known manner to provide sufficient compacting force to the ground or debris beneath each wheel.

A plurality of wear strips 30 are positioned substantially equidistantly from one another on the inner side wall 22 of the wheel. Each wear strip extends substantially the entire length of the inner side wall from the hub portion 18 to the drum portion 20 and are relatively narrow in width. Each wear strip is positioned along a centerline 32 that extends radially from the axis X, about which the wheel rotates. In the illustrated embodiment, five wear strips are shown to be equidistantly spaced around the inner side wall of the wheel and they define a common path of rotation about the axis X.

Figure 1:
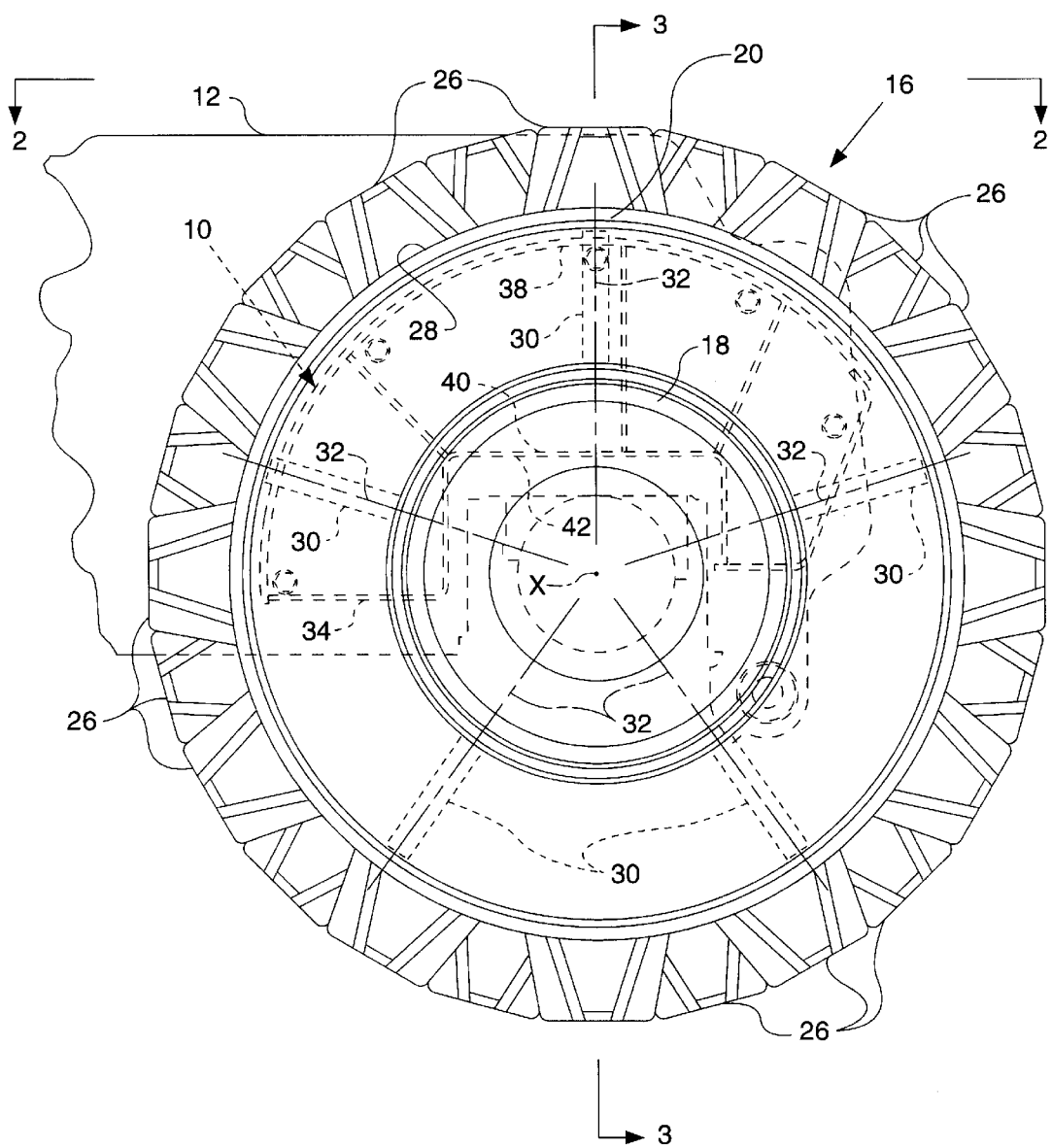
FIG. 1 is a diagrammatic side view of a portion of a machine showing a wheel and axle assembly having a guarding mechanism that embodies the principles of the present invention.
Figure 2:
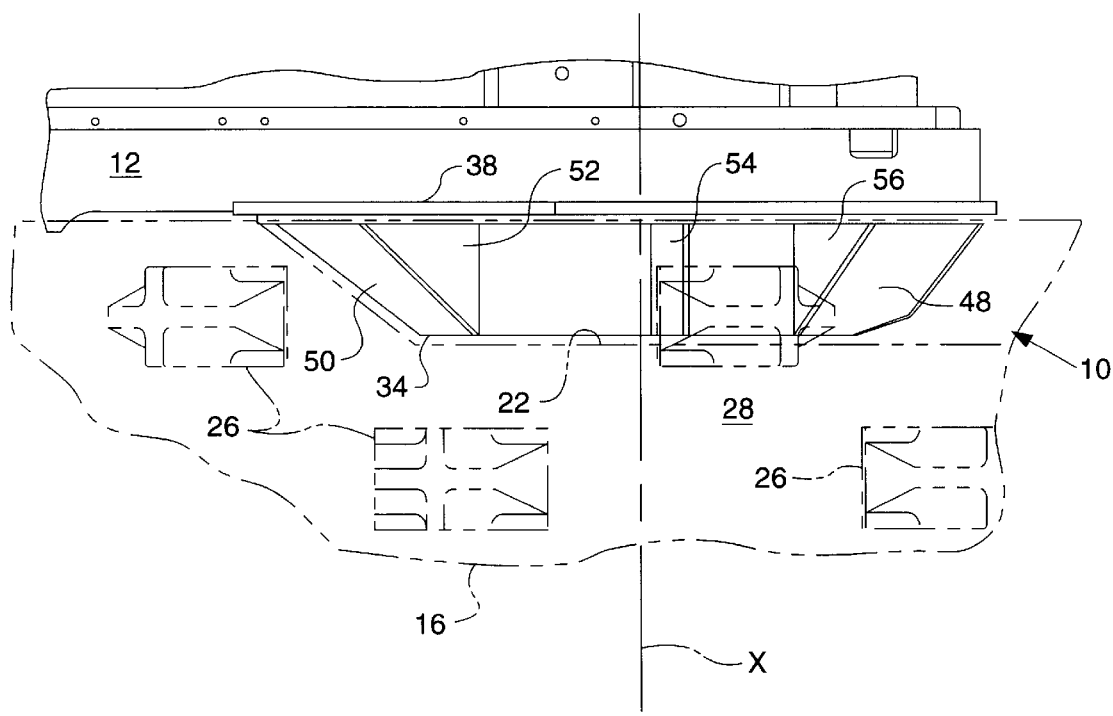
FIG. 2 is a diagrammatic top view of the wheel and axle assembly shown in FIG. 1, taken along lines 2—2 of FIG. 1.

A guard member 34 is mounted to the frame 12 of the machine in an area that is inwardly adjacent the wheel member 16. The guard member has a base plate 36 that is substantially planer and is positioned to lay against the frame. The base plate 36 has a first or an upper flange 38 that defines the radially outer perimeter of the base plate and is positioned to extend laterally, or axially, from the base plate toward the wheel. A second or lower flange 40 defines a lower extremity of the base plate and is positioned radially inwardly from the upper flange 38. The lower flange 40 is shaped to define a notch 42 (FIGS. 4 and 5) that is positioned to extend about an upper portion of the axle assembly 14 and also extends laterally, or axially toward the wheel. The end portions of the upper and lower flanges join one another to form a continuous perimeter about the base plate. The lower flange is positioned generally adjacent the hub portion 18 of the wheel and extends axially a distance that terminates in close proximity to the hub portion of the wheel. The upper flange 38, on the other hand, extends axially to a position that is adjacent the drum member 20 of the wheel and, since the drum member is wider than the hub member, the width, or axial extent, of the upper flange 38 is less than that of the lower flange 40. Each end portion 44 and 46 of the lower flange defines a generally horizontal portion 48 and 50 that is angled inwardly toward the frame 12 at an angle that is substantially equal to the taper defined by the inner side wall 22 of the wheel. A plurality of scraping plates 52, 54 and 56 are secured between the upper and lower flanges 38 and 40 respectively, and extend in an axially direction toward the wheel 16. Each of the scraping plates defines an angled portion 58, 60, and 62 that substantially equals the taper of the inner side wall of the wheel. As can best be seen in FIGS. 2 and 3, each angled portion is positioned in very close, parallel proximity to the inner side wall 22 of the wheel.

Figure 4:
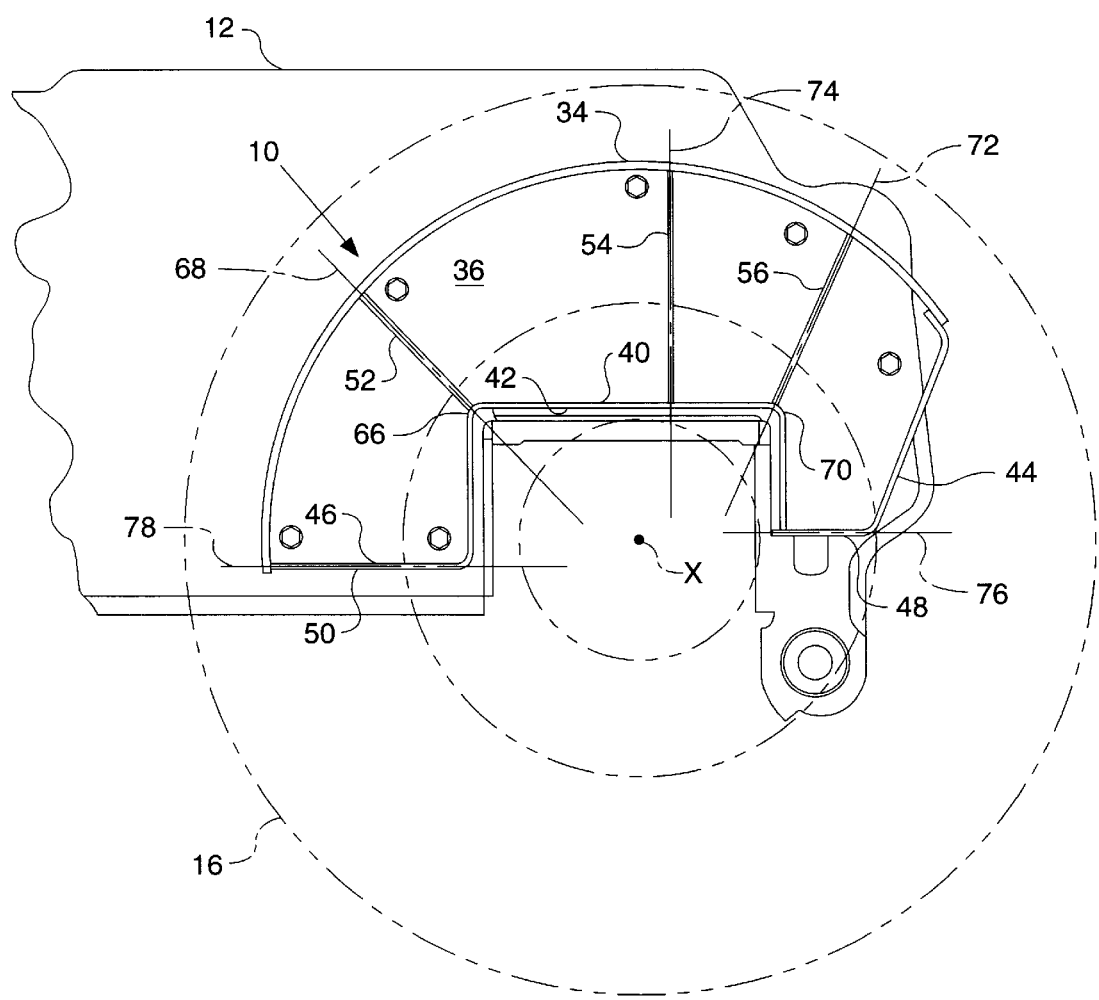
FIG. 4 is a diagrammatic section view taken along lines 4—4 of FIG. 3.
Figure 5:
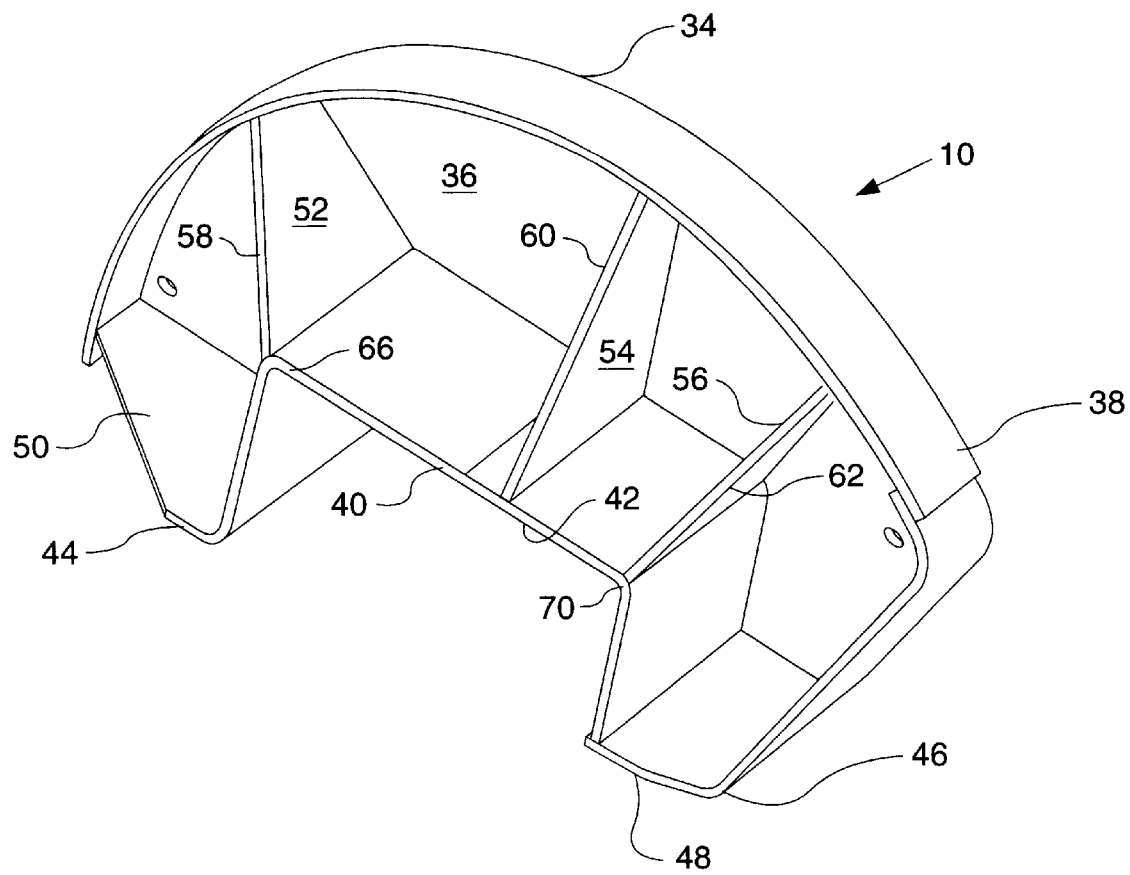
FIG. 5 is a diagrammatic isometric view of the guard member with the surrounding components not shown.

Referring now to FIG. 4, it can be seen that plate 52 is shown to have a lower extremity secured to the lower plate at a location that is adjacent one corner 66 defined by the notch 42 and extends toward the upper flange along a centerline 68. Plate 56 is shown to have a lower extremity secured to the lower plate at a location that is adjacent the other of the corners 70 defined by the notch 42 and extends toward the upper flange along a centerline 72. Plate 54 is positioned between the plates 52 and 56 and extends toward the upper flange along a centerline 74. It is to be noted that all the centerlines 68, 72 and 74 extend from a point that is offset from the axis X, which is the centerline of the wheel and the point at which the centerlines 32, along which the wear strips 30 are centered, intersect. Further, the horizontal portions 48 and 50 defined by the end portions 44 and 46 of the lower flange 40 are positioned at different elevations with respect to one another. Being so positioned, they are positioned along two different centerlines, 76 and 78 respectively, that are also offset from the axis X. Still further, all the centerlines of the angled portions are offset from one another as well as the axis X. Each of the plate members 52, 54 and 56 and the horizontal portions 48 and 50 of the lower flange define angled portions that substantially match the taper of the inner side wall 22 of the wheel 16. Being so configured, the angled portions may be axially located in very closed proximity to the inner side wall of the wheel and especially close to the wear strips as they rotate with the wheel. The configuration of the scraping plates and horizontal portions is such that the closeness in proximity between the respective angled portions and the wear strips will be maintained even though they are located at elevationally different locations with respect to one another.

Industrial Applicability

The operation of a machine such as a landfill compactor, typically requires the machine to traverse a landfill site many times in order to compact the trash that is continually being deposited on the site. As the teeth 26 of each of the compactor wheels 16 penetrate the debris, they will tend to carry some debris with the wheels as they rotate. In the illustrated embodiment, any debris that falls from the wheels will be restricted from falling on the axle by the guard member 34 that is mounted in surrounding relationship to the upper side of the axle assembly 14. Since the guard member overlies the axle assembly, the debris will be directed harmlessly back to the ground.

In the event that a strand of material becomes entrained about the one or more of the wheel members 16, and would happen to fall off the wheel toward the machine, it will most likely be prevented from falling directly on the axle by the guard member 34. In the event that the strand of material would fall from the guard member in a direction toward the wheel, it will have to traverse along the angled portions 58, 60 and 62 of the respective plates 52, 54 and 56. As the material moves down the angled portions of the plates, one of the wear strips 30 will be rotated along a predetermined path of rotation, past the plates, in close proximity to the respective angled portions and will shear the material in two. Since the wear strips 30 are centered along centerlines 32 that are offset from the radial orientation of all of the plates, they will be rotated past the plates at an angle thereto. Being so positioned, the wear strips and the plates react like scissors with respect to one another, enhancing the shearing action therebetween. The severing of the material eliminates the wrapping of the material about the axle and also greatly reduces the possibility of having material forced into the sealing interface between the final drive and the axle assembly. This greatly reduces the downtime and maintenance expenses of the machine while increasing it's reliability.

Other aspects, objects and advantages of this invention can be obtained from a study of the drawings, the disclosure and the appended claims.

What is claimed is:

1. A guarding mechanism, comprising:

a frame;

an axle assembly having an axis and being mounted to the frame and positioned to extend laterally therefrom;

a wheel member having a hub portion, a drum portion positioned concentrically about the hub member and inner and outer side walls positioned radially between the hub portion and the drum portion, said wheel member being mounted on the axle member for rotation about said axis;

at least one wear strip mounted on the inner side wall of the wheel member and being positioned thereon to extend radially from the axis and being rotatable thereabout with the wheel member along a path of rotation that is spaced from the frame a preselected distance; and a guard member having at least one laterally extending plate member, said guard member being mounted to one of the axle assembly and the frame to position the plate member in closely adjacent proximity to the path of rotation defined by the wear strip mounted on the wheel member.

2. The guarding mechanism as set forth in claim 1 wherein the axle assembly extends laterally from opposing sides of the frame and a wheel member is rotatably mounted on the axle assembly on each side of the frame.

3. The guarding mechanism as set forth in claim 1 wherein the drum portion has a width that is greater than that of the hub portion and the inner and outer side walls are tapered inwardly from the drum portion to the hub portion at a preselected angle.

4. The guarding mechanism as set forth in claim 3 wherein the plate member defined by the guard member extends in a generally radial orientation with respect to the axis along a radially extending centerline that is offset from the axis.

5. The guarding mechanismim as set forth in claim 1 wherein a plurality of generally radially extending plates are defined by the guard member, each plate being spaced from one another about the axis and positioned on a radially extending centerline that is offset from the axis and one another.

6. The guarding mechanism as set forth in claim 3 wherein the plate is tapered outwardly with respect to the frame, the angle of the taper being substantially the same as the preselected angle defined by the tapered inner side wall of the wheel member.

7. The guarding mechanism as set forth in claim 1 wherein the axle assembly is an oscillating axle that is pivotally mounted to the frame at a generally central location thereof and pivots with respect to the frame.

8. The guarding mechanism as set forth in claim 7 wherein the guard member is mounted to the axle assembly and pivots therewith with respect to the frame.

9. The guarding mechanism as set forth in claim 7 wherein the guard member is mounted to the frame and the axle assembly pivots with respect thereto.

10. The guarding mechanism as set forth in claim 1 wherein five wear strips are mounted on the inner wall of the wheel member and are positioned substantially equidistantly about the axis.

11. A guarding mechanism adapted for use between and axle assembly mounted to a frame and a wheel member mounted to the axle assembly for rotation with respect thereto about an axis defined by the axle assembly, comprising:

a plurality of wear strips mountable on an inner wall of the wheel member, said wear strips being positioned to extend in a generally radial direction with respect to the axis along a centerline that extends from the axis and being rotatable about the axis along a preselected path of rotation; and a guard member having a plurality of plates defined thereon, said guard member being mountable to the frame with the plates being generally radially oriented with respect to the axis along centerlines that are offset from the axis, said plates extending axially from the frame to a location that is in closely adjacent proximity to the preselected path of rotation defined by the wear strips.

12. The guard mechanism as set forth in claim 11 wherein five wear strips are equidistantly positioned about the axis on the inner wall of the wheel member.

13. The guard mechanism as set forth in claim 11 wherein the guard member further includes:

a base plate mountable to the frame;

an arcuate outer flange extending laterally outwardly from the base plate;

an inner flange extending laterally outwardly from the base plate and being positioned radially inwardly from the outer flange, said inner flange defining a first and second angled end portions of opposing ends thereof, said angled end portions extending laterally from the base plate to a location that is in closely adjacent proximity to the preselected path of rotation defined by the wear strips; and a plurality of plates secured between the outer and inner flanges in spaced relation to one another, said plates extending laterally from the base plate to a location that is in closely adjacent proximity to the preselected path of rotation defined by the wear strips.

14. The guarding mechanism as set forth in claim 13 wherein the angled end portions and the plates defined by the guard member are positioned on generally radially extending centerlines that are offset from the axis and each other.

15. The guarding mechanism as set forth in claim 11 wherein the plates defined by the guard member are positioned on radially extending centerlines that are offset from the axis such that they are positioned an angle with respect to the wear strips as the wear strips rotate relative thereto.

* * * * *